May 21, 1968

W. A. MORTON 3,384,358

CONTINUOUSLY RENEWABLE CHECKER CHAMBER FOR REGENERATIVE
FURNACES AND THE LIKE

Filed Oct. 24, 1965

INVENTOR.
William A. Morton
BY George R. Clark
his attorney

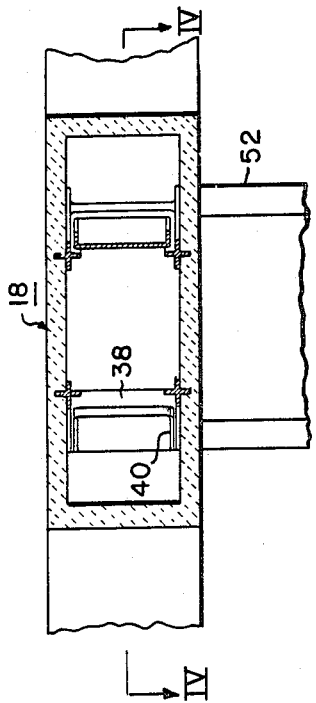
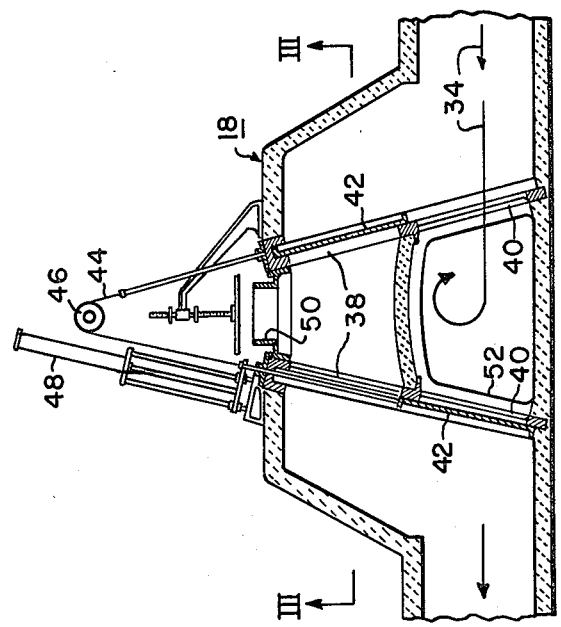
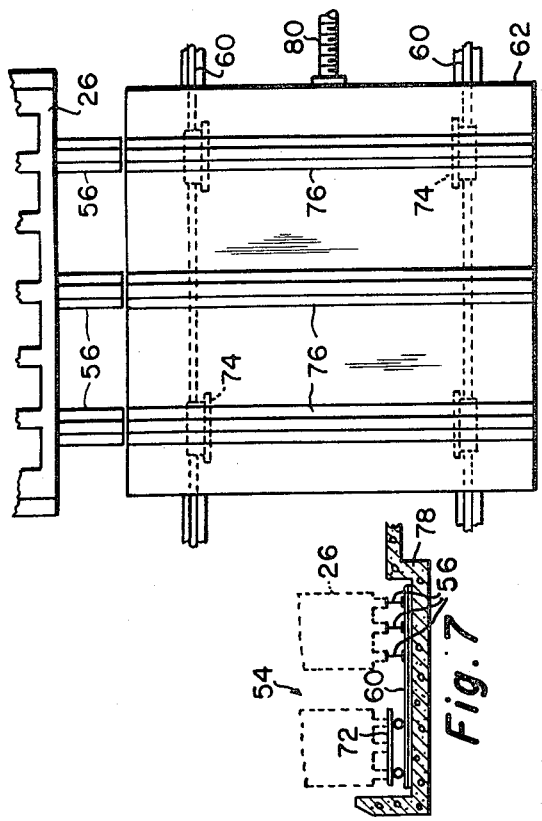
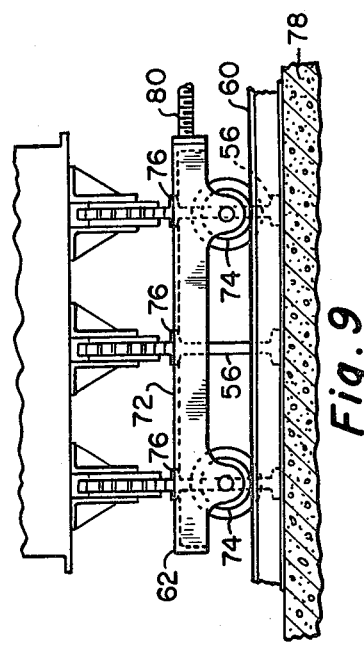
INVENTOR.
William A. Morton

May 21, 1968

W. A. MORTON 3,384,358

CONTINUOUSLY RENEWABLE CHECKER CHAMBER FOR REGENERATIVE FURNACES AND THE LIKE

Filed Oct. 24, 1965

INVENTOR.
William A. Morton
BY George R. Clark
his attorney

United States Patent Office 3,384,358
Patented May 21, 1968

3,384,358
CONTINUOUSLY RENEWABLE CHECKER CHAMBER FOR REGENERATIVE FURNACES AND THE LIKE
William A. Morton, Pittsburgh, Pa., assignor, by mesne assignments, to Sunbeam Engineering Corporation, a corporation of Pennsylvania
Filed Oct. 24, 1965, Ser. No. 504,747
12 Claims. (Cl. 263—51)

ABSTRACT OF THE DISCLOSURE

A system is disclosed for continuously but slowly moving checker assemblies through a chamber or chambers for a regenerative furnace. The checker assemblies are moved in a closely spaced array on individual carriage engaging tracks extending through the checker assembly. Transverse tracks and carriages are employed for singly transferring each checker assembly as it exits from one end of the checker assembly to a second set of tracks extending parallel to the chamber and the first set of tracks. The checker assembly is then cleaned or rebuilt or a new assembly substituted. The renewed checker assembly is then transferred to the entrance of the checker chamber by second transverse track means and carriage.

The present invention relates to regenerative furnaces and more particularly to regenerative furnaces having checker assemblies which are readily moved into and out of the regenerative chambers.

In regenerative furnaces of the character described dust and slag of various types collect in the air-heating passageways of the regenerative chamber, which require shutting down the furnace several times a year to clean or replace the checker assemblies employed therein. This occasions serious interruptions of production from the furnace, a situation which is particularly serious in the case of regenerative glass melting furnaces. Although the lining for the melting hearth of a glass furnace can serve to hold molten glass for about five years, the regenerative chambers used therewith become inefficient due to dust accumulations in a matter of months. When efficiency falls intolerably, the furnace must be shut down to remove the one or more checker assemblies from their regenerative chambers for cleaning or rebuilding.

The invention presents a novel arrangement of regenerative chambers wherein the checker assemblies thereof can be continuously or periodically renewed, thereby maintaining the chamber at a constant level of efficiency, without shutting down the furnace. Renewal of the regenerative chamber or chambers associated with the furnace is accomplished without interfering with the exhaust and preheating functions thereof. Further, during the renewing operation, the apparatus of the invention is arranged so that unwanted cold air drafts are avoided and that the new or rebuilt checker assemblies added to the regenerative chambers are not subject to steep temperature rises.

These and other objects, features and advantages of the invention will be elaborated upon, together with structural details thereof, during the forthcoming description of illustrative forms of the invention, when taken in conjunction with the accompanying drawings wherein:

FIGURE 3 is an enlarged partially sectioned view of the flow reversal valve shown in FIGURES 1 and 2 with the section being taken along reference line III—III of FIGURE 4;

FIGURE 4 is a vertically sectioned view showing the flow reversal valve of FIGURE 3 and taken along reference line IV—IV thereof;

FIGURE 7 is a partial view of the track and carriage arrangement employed at each end of the regenerative chamber and taken generally along reference line VII—VII of FIGURE 1;

FIGURE 8 is an enlarged partial plan view of the carriage and exit opening of one of the regenerative chambers in FIGURE 1; and FIGURE 9 is an enlarged partial elevational view of a loaded carriage at the other end of the regenerative chamber.

Figure 1:
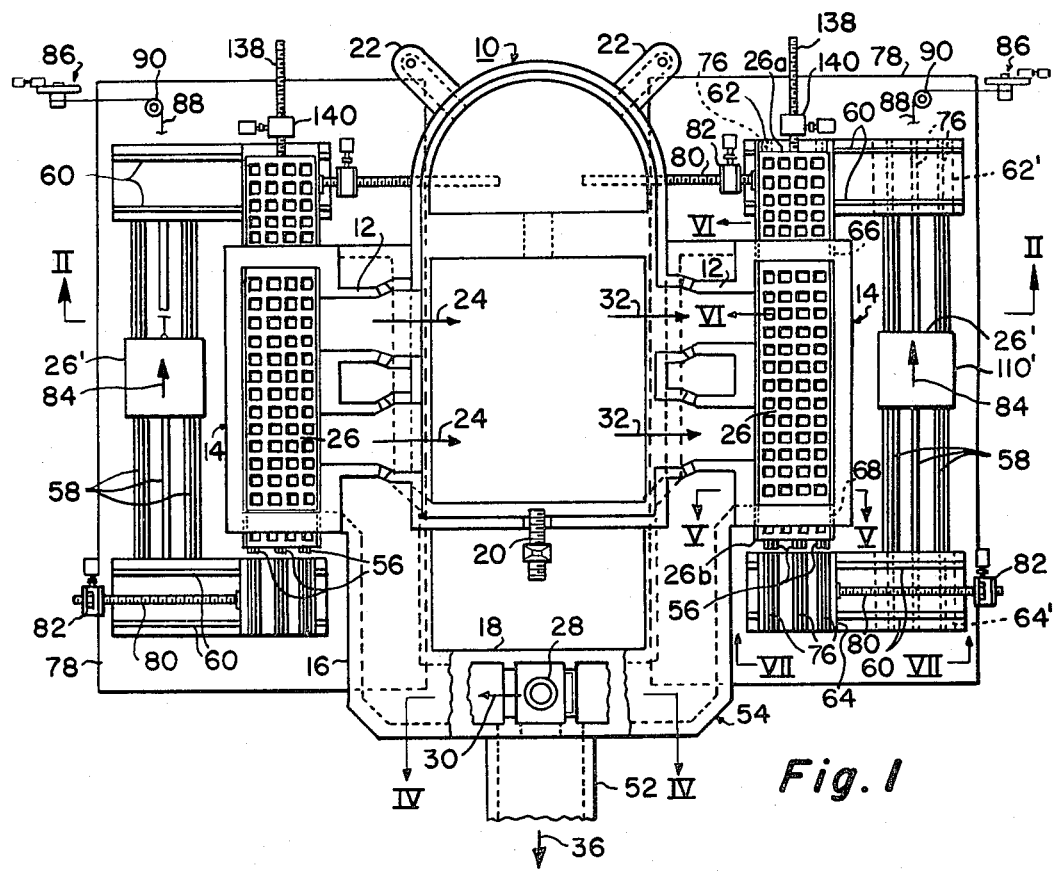
FIGURE 1 is a horizontally sectioned view showing one form of regenerative furnace arranged in accordance with the invention, with the view being taken generally along reference line I—I of FIGURE 2.

Referring now more particularly to the drawings, the invention is incorporated with an open hearth type glass furnace denoted generally by the reference character 10 and coupled at opposite sides thereof to pairs of overhead flues 12 and thence to a pair of regenerative chambers 14 disposed one on each side of the furnace 10 and extending for the most part below the floor level of the furnace. Suitable supports (not shown) are employed, of course, to maintain the furnace 10 and the chambers 14 in the positions shown.

The inward lower side portions of the regenerative chambers 14 are coupled to a bifurcate flue arrangement, denoted generally by the reference character 16, at the fork of which is disposed a relatively large flow reversal valve 18. The glass-producing oxide charge is inducted into the furnace 10 by means of the lead screw 20 where it is converted to molten glass by the heat of combustion of gaseous fuel, such as natural gas, entering the furnace 10 through fuel conduits 22. The necessary air for combustion is supplied alternately to the respective pairs of flues 12, for example as denoted by flow arrows 24, from one of the regenerated chambers 14 where the air has been preheated by flowing upwardly through the hot checker assemblies 26 of the associated one of the regenerative cambers 14. Such air is supplied to the aforementioned regenerative chamber from inlet air conduit 28 as denoted by flow arrow 30 to an opened upper port of the flow reversal valve 18. The combustion gases exit from the glass furnace 10 to the opposite pair of the vents 12 as noted by flow arrows 32. After passing downwardly through the checker assemblies 26 of the associated regenerative chamber, the combustion gases pass through an opened lower port, of the flow-reversal valve 18 as denoted by flow arrows 34 (FIGURE 4), and are then conducted to an exhaust stack (not shown) through outlet portion 52 of the bifurcate conduit 16, as denoted by flow arrow 36.

Of course, as the combustion gases pass downwardly through the checker assemblies 26, the latter are heated to temperature in the neighborhood of 2000° F. to 2900° F. Most of the absorbed heat is then transferred to the incoming air to preheat the same for increased combustion efficiency during the next regenerative cycle, when the flow reversal valve 18 is actuated to cause incoming air to flow upwardly through the heated checker assemblies.

In this way, about 40% of the waste heat of the combustion gases is recovered.

Referring now to FIGURES 3 and 4 of the drawings, a typical form of flow reversal valve includes a pair of upper inlet air ports 38 and a pair of lower outlet or exhaust ports 40 disposed respectively adjacent the inlet ports 38. Slidable valve members 42 are connected in counter-weight fashion by a rope or other stranded cable 44 running over a pulley 46. The valve closures 42 are actuated by a piston and cylinder arrangement 48 to close a lower one of the exhaust ports 40 and simultaneously therewith to close the upper opposite one of the air inlet ports 38. The upper open port 38 communicates with a valved air inlet denoted generally by the reference character 50 and the lower opened exhaust port 40 communicates with the outlet portion 52 and the bifurcate flue duct 16.

The regenerative furnace arrangement described thus far is more or less conventional in nature, and thus the description has not been in great detail. An important difference from prior regenerative chamber arrangements, however, is the fact that in the arrangement of the invention the branches 54 of the bifurcate flue duct 16 have been extended respectively along the long dimension of the regenerative chambers 14, as viewed in FIGURE 1 of the drawings, and thus communicate with an opening 55 extending along the side of the regenerative chambers, as better shown in FIGURE 2 of the drawings. Suitable columnar supports (not shown) can be mounted in the opening 55 to support the chamber wall structure above the opening. This arrangement provides a more uniform dispersal of air and combustion gases through the individual checker assemblies 26 and thereby avoids the necessity of providing for lateral fluid communication therebetween as was necessary in prior regenerative arrangements. Moreover, this arrangement of the bifurcate flue duct work 16 removes the branched portions thereof from the path of apparatus used to load and unload checker assemblies at the vertical end portions of the regenerative chamber.

Referring again to FIGURES 1 and 2 in conjunction with FIGURE 7 and to the enlarged sections and views of portions thereof, as shown in FIGURES 5, 6, 8, and 9; an exemplary arrangement of the invention for loading and unloading checker assemblies relative to the regenerative chambers 14 will not be described. As this description proceeds, it will be apparent that the checker assemblies 26 of each regenerative chamber 14 can be cleaned, replaced or rebuilt either continuously or at predetermined intervals, and in either case, without shutting down or otherwise interrupting production from the glass furnace 10.

Figure 2:
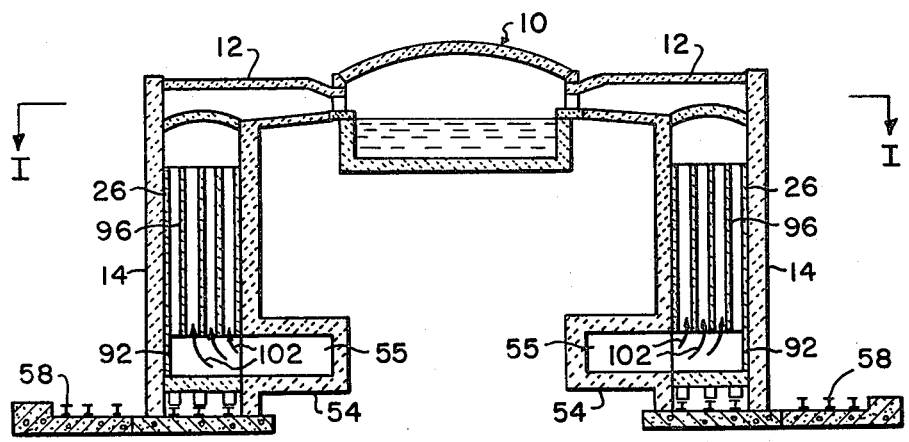
FIGURE 2 is a vertically sectioned view of the regenerative gas furnace of FIGURE 1 taken generally along reference line II—II thereof.

The continuous chamber recharging system of the invention as better shown in FIGURES 1 and 7 of the drawings includes, in this example, two groups of generally parallel tracks 56 and 58. The internal tracks 56 which are three in number in this arrangement extend continuously in a parallel array through the regenerative chamber 14 and extend a short distance from each open end 66 or 68 (FIGURE 1) thereof. The external parallel tracks 58 are likewise three in number, in this example, and are arranged at the same elevation as that of the chamber tracks 56. The external tracks 58 are similar in spacing and length to that of the chamber tracks 56 and extend at each of their ends in proximity to a pair of relatively shorter transverse tracks 60 disposed, in this example, normal to the internal and external tracks 56 and 58 but on a lower elevational plane. The end pairs of tracks 60 thus extend across the ends of both the internal and external tracks 56 and 58 but desirably at the same lower elevation below the tracks 56 and 58.

A movable carriage 62 or 64 is mounted respectively on each pair of the transverse tracks 60 and is movable to positions in alignment respectively with the entrance and exit openings 66 and 68 of the regenerative chamber 14 and to similar positions of alignment denoted by the dashed outlines 62′ and 64′ with the ends of the external tracks 58 and hence with a third carriage 110′ mounted for movement thereon.

Each of the carriages 62 and 64, as better shown in FIGURES 8 and 9, is constructed with a generally planar load carrying platform 72 mounted upon a pair of wheel-supported axle assemblies 74, which in turn engage a pair of the track members 60. On the top of each platform 72 are mounted in spaced parallel array a plurality of relatively short track members 76. The height of the load carrying platforms 72 corresponds to the difference in elevation between the transverse tracks 60 and the remaining tracks 56, 58, and the alignment of the track members 76 thereon are such that when the carriages 62 and 64 are disposed in the positions denoted by their solid outlines in FIGURE 1, that is to say in alignment with the chamber entrances 66 and 68, their track members 76 are spatially aligned with the chamber tracks 56 respectively. Likewise, when the carriages are disposed at 62′ and 64′ respectively their track members are aligned with the external tracks 58.

Figure 6:
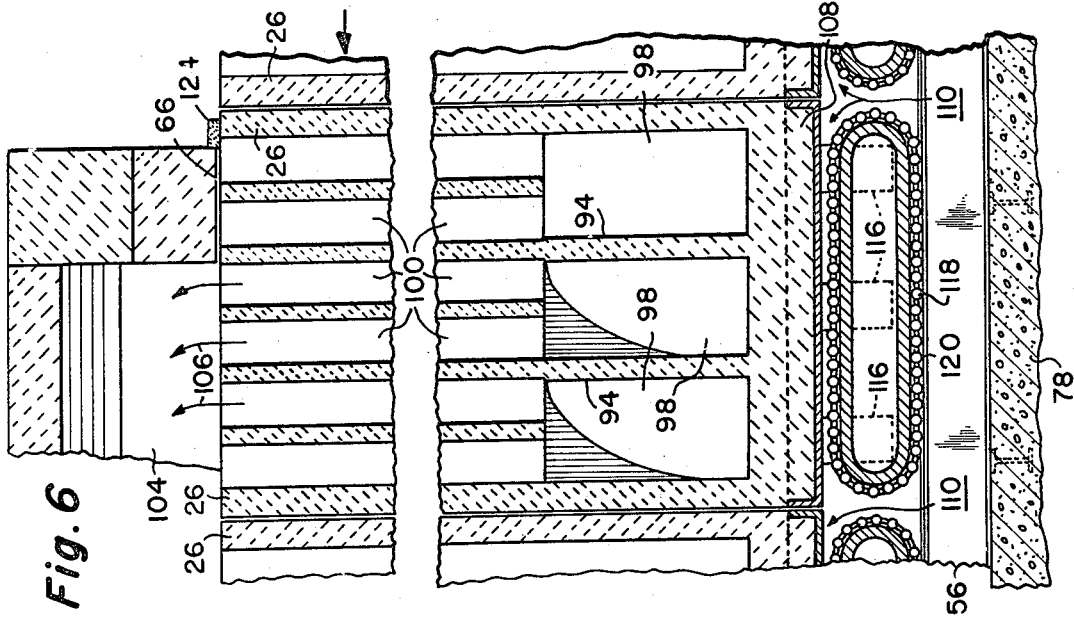
FIGURE 6 is an enlarged vertically sectioned view of the entrance end portion of the regenerative chamber of FIGURE 5, with the view being taken generally along reference line VI—VI of FIGURE 5 and along partial reference line VI—VI of FIGURE 1.
Figure 5:
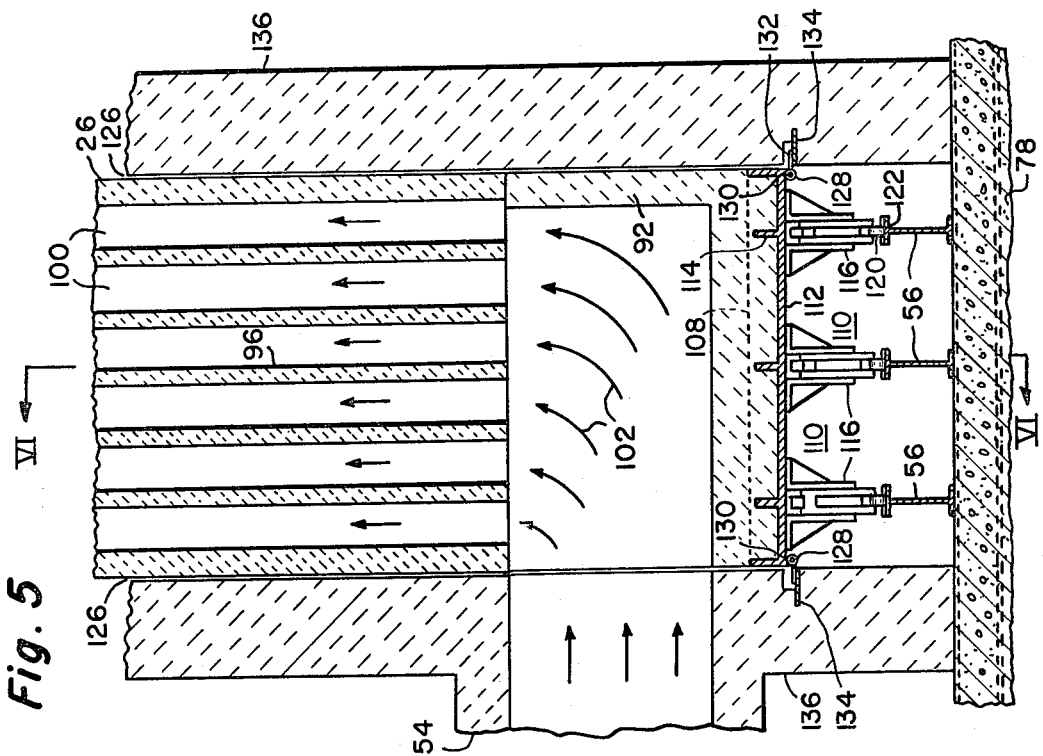
FIGURE 5 is an enlarged vertically sectional view taken adjacent the exit end of one of the regenerative chambers of FIGURE 1 along reference line V—V thereof.

As better shown in FIGURES 5, 6, and 9, the internal and external tracks 56 and 58 are formed from narrow-flanged I-beams having sufficient web width to bridge the required elevation between the track members 76 and the surface of concrete support 78.

Each of the transverse carriages 62 and 64 can be driven in either direction along their associated tracks 60 by an all-thread drive screw readily mounted in a chuck or holder 82 and moved longitudinally in either direction by suitably directed rotation of the holder 82.

With the external tracks 58 being of the same height as the internal or chamber tracks 56, the tracks 58 are similarly aligned with the carriages 62 and 64 when placed in their positions 62′ and 64′. A checker assembly, for example, the checker assembly 26′, thus can engage the raised external tracks 58 in the same manner as described hereinafter in connection with the remaining checker assemblies 26 and the chamber tracks 56. Since the checker assembly 26′ travels only in the direction indicated by arrow 84 along the external tracks 58, a cable drive denoted generally by reference character 86 is provided therefor, which moves the checker assembly 26′ along the external tracks 58 by means of draw cable 88 running over pulley 90.

As better shown in FIGURES 5 and 6 of the drawings, each checker assembly 26 is mounted for independent movement relative to the other checker assemblies 26 in a manner described hereinafter in greater detail. Each of the checker assemblies includes a lower flue or plenum portion 92 having partitions or rider walls 94 to afford adequate support to the superstructure or checker proper designated by the reference character 96. As in the case of the checker structure 96 the flue portion 92 is constructed of fire brick or the like because of the extremely high temperatures which are encountered. The flue portion 92 thus has a plurality of spaces 98 therein disposed for communication with vertical passages 100 through the checker portion 96 and with the interior of the flue duct 55 as denoted by flow arrows 102. At the top of each checker assembly 26, the passages 100 extending therethrough communicate with an upper plenum chamber 104 formed in the regenerative chamber 14 and communicating with the overhead vents 12 and then to the furnace 10, as denoted by flow arrows 106.

The flue or plenum portion 92 of each checker assembly 26 rests upon a reinforced masonry platform 108, which is movably supported upon the chamber tracks 56. In this arrangement of the invention, each platform 108 forms part of a carrier structure denoted generally by reference character 110 and is reinforced by means of a steel backing plate 112 having a plurality of vertical ribs 114 extending into the masonry portion of the platform 108. Because of the extreme weights and temperatures involved in the construction and use of the checker assemblies 26, the carrier structure 110 in this arrangement of the invention is furnished with a nine-point suspension as denoted by the endless chain brackets 116. As better shown in FIGURES 5 and 6 of the drawings, the brackets 116 are arranged in parallel groups of three with each group of three brackets engaging, for support of the load-carrying platform 108, an endless roller chain tread denoted generally by reference character 118. Thus, three such treads 118 are used in this example of the invention and are spaced laterally for proper engagement of their roller bearing members 120 with the central depressed track grooves 122 respectively formed in the chamber track members 56 and the parallel external track array 58, and also the relatively short track portions 76 of the transverse carriages 62 and 64.

It will be noted in FIGURE 6 of the drawings, that the treads and associated components of each carrier structure 110 are completely overlaid by its load-carrying platform 108 so that the latter can abut the confronting edges of adjacent carrier structures 110 with the result that the checker assemblies 26 can be moved through the regenerative chamber 14 in a closely spaced array, as evident from FIGURE 1 of the drawings.

It will also be seen from FIGURE 1 in conjunction with an inspection of FIGURES 5 and 6 that the checker assemblies 26 are very closely spaced relative to the walls of the regenerative chamber 14 and particularly to the top and side edges of the entrance and exit openings 66 and 68 thereof. This arrangement permits the array of checker assemblies 26 to be moved continuously but very slowly through the regenerative chambers 14 without permitting the infiltration of significant amounts of ambient, relatively cold air. If desired, however, the very small clearances at the top and side surfaces relative to the checker assemblies extending through the entrance and exit openings 66 and 68 respectively can be substantially closed by the use of steel strips, similar, for example, to the strip 124 (FIGURE 6). The lower extremities of the clearances (FIGURE 5) are sealed throughout the chambers 14 by a pair of elongated steel tubes 128 extending continuously through each chamber 14 and complementarily engaging grooves 130 formed on the underside of the load-carrying platforms 108. The tubes 128 are relatively flexibly mounted by relatively thin steel ribbons 132 which in turn are secured as by spot welding to steel strips 134 embedded in the wall structures 136 of each chamber 14.

In the operation of the invention, referring once again to FIGURE 1 of the drawings, each checker assembly 26 is constructed independently on the carrier structure therefor in a structure known as a chimney flue setting characterized by the use solely of the vertical flow passages 100 mentioned previously. The actual stacking of each checker assembly can be accomplished, for example, when its associated carrier structure is supported upon the transverse entrance carriage 62 as when it is positioned as denoted by the phantom outline 62'. Of course, such stacking can be accomplished also when its carrier structure 110' is supported upon the external tracks 58 in the position denoted by the reference character 26', although this area is best reserved for cleaning operation with respect to those checker assemblies which do not require renewing or restacking due to broken or fused flue linings and the like.

When thus cleaned or otherwise reprocessed or stacked, the checker assembly 26' is towed along the external tracks 58, by means of the tow cable 88 attached to its carriage structure 110' to a position adjacent the upper ends of the external tracks 58 (as viewed in FIGURE 1 of the drawings), where the tow cable 88 is actuated further to draw the carrier structure 110' completely onto the track members 76 of the transverse carriage 62'. Prior to this operation, however, the newly stacked, built, or cleaned checker assembly 26a adjacent the entrance 66 to the regenerator chamber 14 is pushed from the carriage 62 so that the checker assembly 26a, which is shown as resting for the most part on the track members 76 of the carriage 62 is slowly moved into engagement of its carrier structure 110 with the chamber tracks 56.

The latter operation is accomplished by means of an elongated lead screw 138 which is moved longitudinally, by a rotating thruster arrangement denoted generally by reference character 140, against the carrier structure 110 of the checker assembly 26a. The thruster or holder 140, is supported against longitudinal movement and rotated about the lead screw 138 to produce the desired longitudinal movement of the lead screw. The lead screw is moved at a rate of between ¼ and 1¼ inches per hour to avoid undue thermal shock in the checker assembly structure as each assembly 26 is moved into the entrance opening 66 of the regenerative chamber 14. In this arrangement of the invention the checkers are stacked to a height of between 12 to 15 feet on each carrier structure 110 and have a floor dimension of about 8 x 8 feet. Since high temperature exhaust gases are injected alternately into the regenerative chambers 14 at temperatures varying between 2000° and 2900° F., this slow rate of movement is essential to prevent cracking or disintegration of the checker assembly structure.

In one arrangement of the invention, the inside floor dimensions of each regenerative chamber 14 are about 8 x 30 feet, and assuming a rate of movement of about one inch per hour, it is evident that 15 days would be required to change each chamber. It will be evident from the foregoing that such changes, however, can be readily effected without shutting down or interrupting production from the furnace 10 and without impairing the efficiency of the regenerator chamber. Moreover, the checker assemblies can be changed continuously where required. For most industries, however, a complete checker assembly change every 6 months will suffice to ensure an "as new" condition for heat exchanging purposes.

As the array of checker assemblies 26 are moved as aforesaid through the regenerative chambers 14, an endmost one 26b of the checker assemblies, is pushed through the exit opening 68 at the other end of the regenerator chamber 14. Continued movement of the array of checker assemblies by operation of the drive screw arrangement 138–140 further pushes the endmost checker assembly 26b completely on to the aligned track members 76 of the exit transverse carriage 64. When this occurs, movement of the array of checker assemblies 26 is terminated after the adjacent checker assembly 26 reaches the outer ends of the chamber tracks 56, during which time the carriage 64 is drawn by the drive screw 80 secured thereto to the carriage position 64' where the track members 76 are respectively aligned with the external track members 58. The tow cable 88 is then attached to the carrier structure of the checker assembly which is now supported upon the carriage 64 and the last-mentioned checker assembly is drawn from the carriage at 64' onto the external tracks 58 to the position denoted by the checker assembly 26' for cleaning or further processing of the checker assembly. From this position, the checker assembly 26' is then moved onto the aligned track members 76 of the carriage 62 as described above for continuation of the changing cycle.

From the foregoing, it will be apparent that novel and efficient forms of regenerative furnaces and their components together with novel means for continuously renewing their checker assemblies have been described herein. The descriptive and illustrative materials employed herein have been presented for purposes of exemplifying the invention and not in limitation thereof. Therefore, numerous modifications of the invention will occur to those skilled in the art without departing from the spirit and scope of the invention. Moreover, it is to be understood that certain features of the inveniton can be employed to advantage without a corresponding use of other features thereof.

I claim:

1. In a renewable checker chamber arrangement for regenerative furnaces and the like, the combination comprising an elongated open-ended wall structure for said chamber, a group of substantially parallel track members extending through said wall structure and protruding from the open ends thereof, a second group of substantially parallel track members supported externally of said wall structure, said last-mentioned track members being substantially parallel to and substantially at the elevation of said first track members, a pair of transverse rail members disposed at each end of said track member groups, a movable transverse carriage engaging each pair of said rail members, each of said transverse carriages having a load-carrying platform with spaced track sections thereon, the spacing of said track sections and the elevation of said load-carrying platform being such that said track sections can be aligned spatially and respectively with the track members of either one of said groups, means for longitudinally moving said transverse carriages along said transverse rails respectively, and means for moving checker assemblies along said groups of track members and across the track sections of said transverse carriage, said last-mentioned means including a like number of individual carriages for said checker assemblies, said individual carriages having substantially the same configuration in plan as that of said checker assemblies so that said individual carriages and the checker assemblies mounted thereon can be moved in a closely spaced array through said chamber, and means for moving said individual carriages in a closely spaced array along said first track group and in a single array along said second track group and including the track members of said transverse carriages when aligned respectively with said first and said second track groups.

2. In a renewable checker chamber arrangement for regenerative furnaces and the like, the combination comprising an elongated open-ended wall structure for said chamber, a first group of tracks extending through said chamber, a plurality of checker assemblies and individual carriages therefor mounted for movement in a closely spaced array along said first track group and through said chamber, the opening in each end of said wall structure closely conforming to the shape of said checker assemblies to prevent infiltration of ambient air, a second group of tracks mounted adjacent and externally of said wall structure, said assemblies and individual carriages being mounted for movement in a single array along said second track group, a pair of transverse carriages mounted for movement adjacent the ends respectively of said wall structure and said tracks, a plurality of track members supported on each of said transverse carriages, means for moving each of said transverse carriages between positions of respective alignment of its track members with the adjacent track ends of said track groups, track-engaging and carriage-supporting means mounted on said individual carriages for engaging said first and said second track groups and said track members when aligned therewith, and means for continuously moving said assemblies and their carriages in closely spaced array along said first track group and in single array along said second track group.

3. In a renewable checker chamber arrangement for regenerative furnaces and the like, the combination comprising an elongated open-ended wall structure for said chamber, a first group of tracks extending through said chamber, a plurality of checker assemblies mounted for movement in a closely spaced array along said first track group, the opening in each end of said wall structure closely conforming to the shape of said checker assemblies to prevent infiltration of ambient air, a second group of tracks mounted adjacent and externally of said wall structure, a pair of transverse carriages mounted for movement adjacent the ends respectively of said wall structure and said track groups, a plurality of track members supported on each of said transverse carriages, means for moving said transverse carriages between positions of respective alignment of its track members with the adjacent track ends of said track groups, and means for moving each of said checker assemblies along each of said track groups, said last-mentioned means including a like number of individual carriages for said checker assemblies, said individual carriages having substantially the same configuration in plan as that of said checker assemblies so that said individual carriages and the checker assemblies mounted thereon can be moved in a closely spaced array through said chamber, and means for moving said individual carriages in a closely spaced array along said first track group and in a single array along said second track group and including the track members of said transverse carriages when aligned respectively with said first and said second track groups.

4. In a renewable checker chamber arrangement for regenerative furnaces and the like, the combination comprising an elongated open-ended generally rectangular wall structure for said chamber, a first group of tracks extending through said chamber, a second group of tracks mounted adjacent and externally of said wall structure, a plurality of checker assemblies mounted for movement in a closely spaced array along said first track group and in a single array along said second track group, the opening in each end of said wall structure closely conforming to the shape of said checker assemblies to prevent infiltration of ambient air, a pair of transverse carriages mounted for movement adjacent the ends respectively of said wall structure and said track groups, a plurality of track members supported on each of said transverse carriages, means for moving said transverse carriages between positions of respective alignment of its track members with the adjacent ends of said track groups respectively, said track groups being substantially parallel and being supported at substantially the same elevation, each of said transverse carriages being supported on rail members positioned at a relatively lower elevation, and the individual heights of said transverse carriages being such that the track members thereof lie on the same elevation as that of said track groups, and means for moving said checker assemblies along said first and said second track groups including said transverse carriage track members when aligned therewith, said last mentioned means including a like number of individual carriages for said second assembly, said individual carriages having substantially the same configuration in plan as that of said checker assemblies so that said individual carriages and the checker assemblies mounted thereon can be moved in a closely spaced array through said chamber, and means for moving said individual carriages in a closely spaced array along said first track group and in a single array along said second track group and including the track members of said transverse carriages when aligned respectively with said first and said second track groups.

5. In a renewable checker chamber arrangement for regenerative furnaces and the like, the combination comprising an elongated open-ended generally rectangular wall structure for said chamber, a first group of tracks extending through said chamber, a second group of tracks mounted adjacent to and externally of said wall structure, a plurality of checker assemblies mounted for movement in a closely spaced array along said first track group and in single array along said second track group, the opening in each end of said wall structure closely conforming to the shape of said checker assemblies to prevent infiltration of ambient air, a pair of transverse carriages mounted for movement adjacent the ends respectively of said wall structure and of said track groups, a plurality of track members supported on each of said transverse carriages, means for moving said transverse carriages between positions of respective alignment of its track members with the adjacent ends of said track groups respectively, each of said checker assemblies being mounted upon an individual carrier structure engageable with each of said track groups for movement therealong, said carrier structures each having a reinforced masonry platform having a plan configuration substantially identical to the bottom plan configuration of the associated checker assembly, said last-mentioned means including a like number of individual carriages for said checker assemblies, and means for moving said individual carriages in a closely spaced array along said first track group and in a single array along said second track group and including the track members of said transverse carriages when aligned respectively with said first and said second track groups.

6. In a renewable checker chamber arrangement for regenerative furnaces and the like, the combination priseing an elongated open-ended generally rectangular wall structure for said chamber, a first group of tracks extending through said chamber, a plurality of checker assemblies mounted for movement in a closely spaced array along said track groups, the opening in each end of said wall structure closely conforming to the shape of said checker assemblies to prevent infiltration of ambient air, a second group of tracks mounted adjacent to and externally of said wall structure, a pair of carriages mounted for movement adjacent the ends respectively of said wall structure and said track groups, a plurality of track members supported on each of said carriages, means for moving said carriages between positions of respective alignment of its track members with the adjacent ends of said track groups, each of said checker assemblies being mounted upon an individual carrier structure engageable with each of said track groups for movement therealong, each of said carriage structures being supported by a plurality of endless roller chains corresponding in number to that of said first and said second tracks and respectively engageable with said tracks, and a load-carrying platform for each carrier structure, said platform completely overlaying said endless chain so as to abut the confronting surfaces of adjacent carrier structure platforms to permit closely spacing said checker assemblies wihin said regenerative chamber.

7. In a renewable checker chamber arrangement for regenerative furnaces and the like, the combination comprising an elongated open-ended generally rectangular wall structure for said chamber, a first group of tracks extending through said chamber, a plurality of checker assemblies mounted for movement in a closely spaced array along said first track group, the opening in each end of said wall structure closely conforming to the shape of said checker assemblies to prevent infiltration of ambient air, a second group of tracks mounted adjacent to and externally of said wall structure, a pair of carriages mounted for movement adjacent the ends respectively of said wall structure and said track groups, a plurality of track members supported on each of said carriages, means for moving said carriages between positions of respective alignment of its track members with the adjacent ends of said track groups, and a flue duct extending along one side of said wall structure adjacent the lower portion thereof, said flue duct enclosing a plenum chamber communicating substantially along its length with said wall structure lower portion, said wall structure enclosing a second plenum chamber in the upper portion thereof and above said checker assemblies, each of said checker assemblies including a lower hollow plenum member disposed for communication with said flue plenum chamber as said checker assembly is moved through said wall structure and including a vertical flue portion having vertical passages connecting with said checker plenum member and with said second plenum chamber.

8. In a renewable checker chamber arrangement for regenerative furnaces and the like, the combination comprising an elongated open-ended generally rectangular wall structure for said chamber, a first group of tracks extending through said chamber, a plurality of checker assemblies mounted for movement in a closely spaced array along said first track group, the opening in each end of said wall structure closely conforming to the shape of said checker assemblies to prevent infiltration of ambient air, a second group of tracks mounted adjacent to and externally of said wall structure, a pair of carriages mounted for movemeent adjacent the ends respectively of said wall structure and said track groups, a plurality of track members supported on each of said carriages, means for moving said carriages between positions of respective alignment of its track members with the adjacent ends of said track groups, a flue duct extending along one side of said wall structure adjacent the lower portion thereof, said flue duct enclosing a plenum chamber communicating substantially along its length with said lower wall structure portion, said wall structure enclosing a second plenum chamber in the upper portion thereof and above said checker assemblies, each of said checker assemblies including a lower hollow plenum member disposed for communication with said flue plenum chamber as said checker assembly is moved through said wall structure and including a vertical flue portion having vertical passages connecting said checker plenum member and with said second plenum chamber, said flue plenum chamber and said checker plenum member being spaced above said chamber track group, and a carrier structure for each of said checker assemblies mounted in said space and engaging said chamber tracks for movement therealong.

9. In a renewable checker chamber arrangement for regenerative furnaces and the like, the combination comprising an elongated open-ended generally rectangular wall structure for said chamber, a group of track extending through said chamber, a plurality of checker assemblies mounted for movement in a closely spaced array along said track group, the opening in each end of said wall structure closely conforming to the shape of said checker assemblies to prevent infiltration of ambient air, a flue duct extending along one side of said wall structure adjacent the lower portion thereof, said flue duct enclosing a plenum chamber communicating substantially along its length with said lower wall structure portion, said wall structure enclosing a second plenum chamber in the upper portion thereof and above said checker assemblies, each of said checker assemblies including a lower hollow plenum member disposed for communication with said flue plenum chamber as said checker assembly is moved through said wall structure and including a vertical flue portion having vertical passages connecting said checker plenum member and with said second plenum chamber, said flue plenum chamber and said checker plenum member being spaced above said chamber track group, and a carrier structure for each of said checker assemblies mounted in said space and engaging said chamber tracks for movement therealong.

10. In a renawable checker chamber arrangement for regenerative furnaces and the like, the combination comprising an elongated open-ended generally rectangular wall structure for said chamber, a group of tracks extending through said chamber, a plurality of checker assemblies mounted for movement in a closely spaced array along said track group, the opening in each end of said wall structure closely conforming to the shape of said checker assemblies to prevent infiltration of ambient air, and a flue duct extending along one side of said wall structure adjacent the lower portion thereof, said flue duct enclosing a plenum chamber communicating substantially along its length with said wall structure lower portion, said wall structure enclosing a second plenum chamber in the upper portion thereof and above said checker assemblies, each of said checker assemblies including a lower hollow plenum member disposed for communication with said flue plenum chamber as said checker assembly is moved through said wall structure and including a vertical flue portion having vertical passages connecting with said checker plenum member and with said second plenum chamber.

11. The combination according to claim 2 wherein said track-engaging and carriage-supporting means include an endless roller chain arrangement mounted on the underside of each of said individual carriages and engageable with said first and said second track groups and with said track members when aligned therewith.

12. The combination according to claim 11 wherein a like number of endless roller chains relative to that of said track groups are mounted on each of said individual carriages, the rollers of said chains being engageable with grooves provided respectively therefor in the top surface of said tracks.

References Cited

UNITED STATES PATENTS

| | | | |
|---|---|---|---|
| 1,968,775 | 7/1934 | Robertson | 263—28 |
| 2,386,676 | 10/1945 | French | 34—242 |
| 2,504,707 | 4/1950 | Lloyd | 263—28 |

FREDERICK L. MATTESON, JR., *Primary Examiner.*

J. J. CAMBY, *Assistant Examiner.*

UNITED STATES PATENT OFFICE
CERTIFICATE OF CORRECTION

Patent No. 3,384,358                            May 21, 1968

William A. Morton

It is certified that error appears in the above identified patent and that said Letters Patent are hereby corrected as shown below:

In the heading to the printed specification, lines 6 and 7, "Sunbeam Engineering Corporation, a corporation of Pennsylvania" should read -- Sunbeam Corporation, a corporation of Illinois --. Column 2, line 67, "temperature" should read -- temperatures --. Column 3, line 45, "not" should read -- now --. Column 9, line 13, "com-priseing" should read -- comprising --; line 38, "wihin" should read -- within --. Column 10, line 4, "movemeent" should read -- movement --; line 29, "track" should read -- tracks --; line 52, "renawable" should read -- renewable --.

Signed and sealed this 16th day of December 1969.

(SEAL)
Attest:

EDWARD M. FLETCHER, JR.                    WILLIAM E. SCHUYLER, JR.
Attesting Officer                           Commissioner of Patents